United States Patent [19]

Heinrici et al.

[11] Patent Number: 5,735,439
[45] Date of Patent: Apr. 7, 1998

[54] APPARATUS FOR THE METERED DISCHARGE OF BULK MATERIAL FROM A FLEXIBLE SUPPLY CONTAINER ESPECIALLY IN A DOSING SYSTEM

[75] Inventors: Harald Heinrici, Biebesheim; Ludger Toerner, Eppertshausen; Juergen Biebel, Ruesselsheim, all of Germany

[73] Assignee: Carl Schenck AG, Darmstadt, Germany

[21] Appl. No.: 723,530

[22] Filed: Sep. 30, 1996

[30] Foreign Application Priority Data

Oct. 6, 1995 [DE] Germany ............... 195 37 219.0

[51] Int. Cl.$^6$ ............................................. B65D 83/00
[52] U.S. Cl. ..................... 222/199; 222/200; 222/203
[58] Field of Search ............................ 222/199, 200, 222/203, 181, 234

[56] References Cited

U.S. PATENT DOCUMENTS

| | | |
|---|---|---|
| 2,792,030 | 5/1957 | Wahl ........................... 222/200 |
| 3,062,414 | 11/1962 | Morris . |
| 3,865,278 | 2/1975 | Gallati ........................ 222/200 |
| 4,346,802 | 8/1982 | Popper . |
| 4,545,509 | 10/1985 | Muschoot et al. ............ 222/199 |
| 4,972,970 | 11/1990 | Toerner . |

FOREIGN PATENT DOCUMENTS

| | | |
|---|---|---|
| 2409125 | 9/1975 | Germany . |
| 3310721 | 11/1983 | Germany . |
| 3800565 | 7/1989 | Germany . |
| 4116327 | 11/1992 | Germany . |
| 667473 | 6/1979 | U.S.S.R. ................ 222/109 |
| WO/85046637 | 10/1985 | WIPO . |

OTHER PUBLICATIONS

Brochure entitled: "Volumetrische Dosierer" (Volumetric Dosing Device), Series 100–1200, published by Carl Schenck AG, Darmstadt, Federal Republic of Germany, publication date Oct. 1994.

Brochure entitled: "Krause Silo", published by Walter Krause GmbH, Walheim, Federal Republic of Germany, 1982.

Primary Examiner—Philippe Derakshani
Attorney, Agent, or Firm—W. G. Fasse; W. F. Fasse

[57] ABSTRACT

A dosing mechanism is equipped with a bulk material container such as a silo which has at least one movable or flexible wall portion that is moved to help in the discharge of the bulk material through a discharge device. The motion of the discharge device is transmitted directly to the movable wall portion by rigidly connecting the discharge device directly to the movable wall or wall portion and by movably mounting the discharge device below the silo.

17 Claims, 2 Drawing Sheets

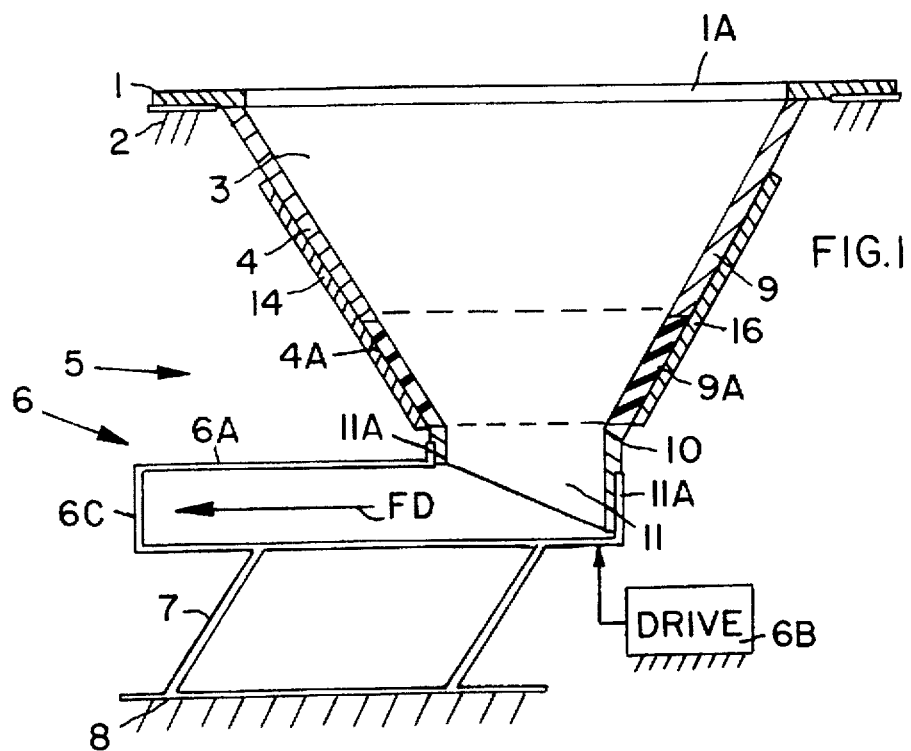
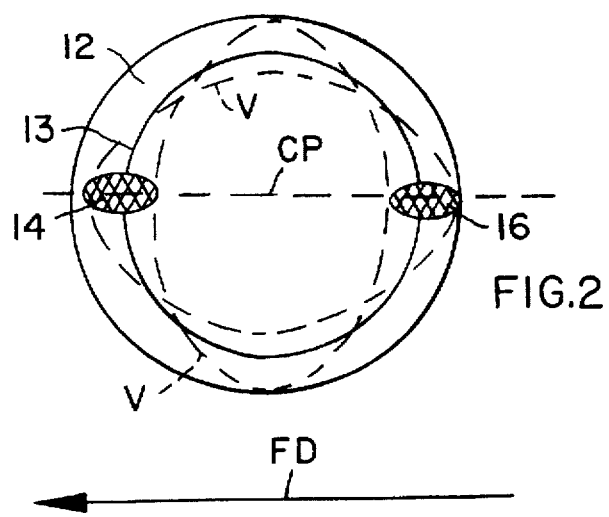

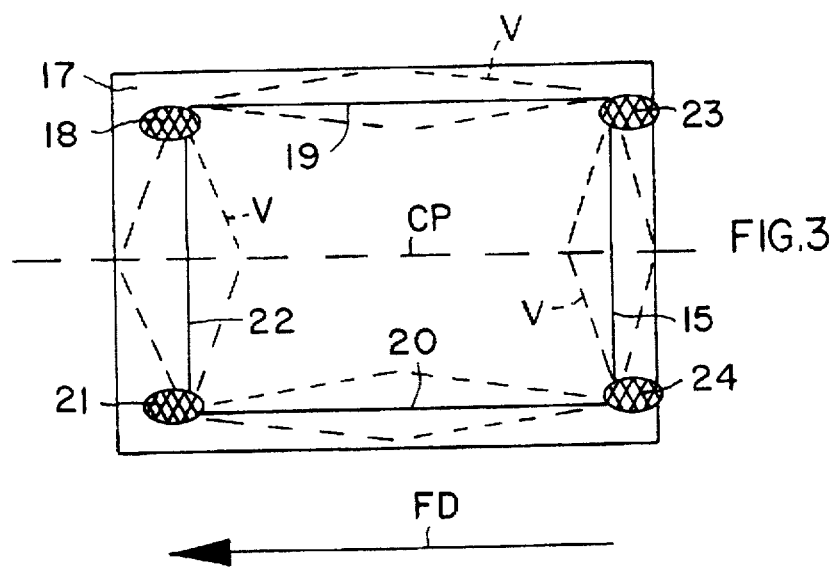
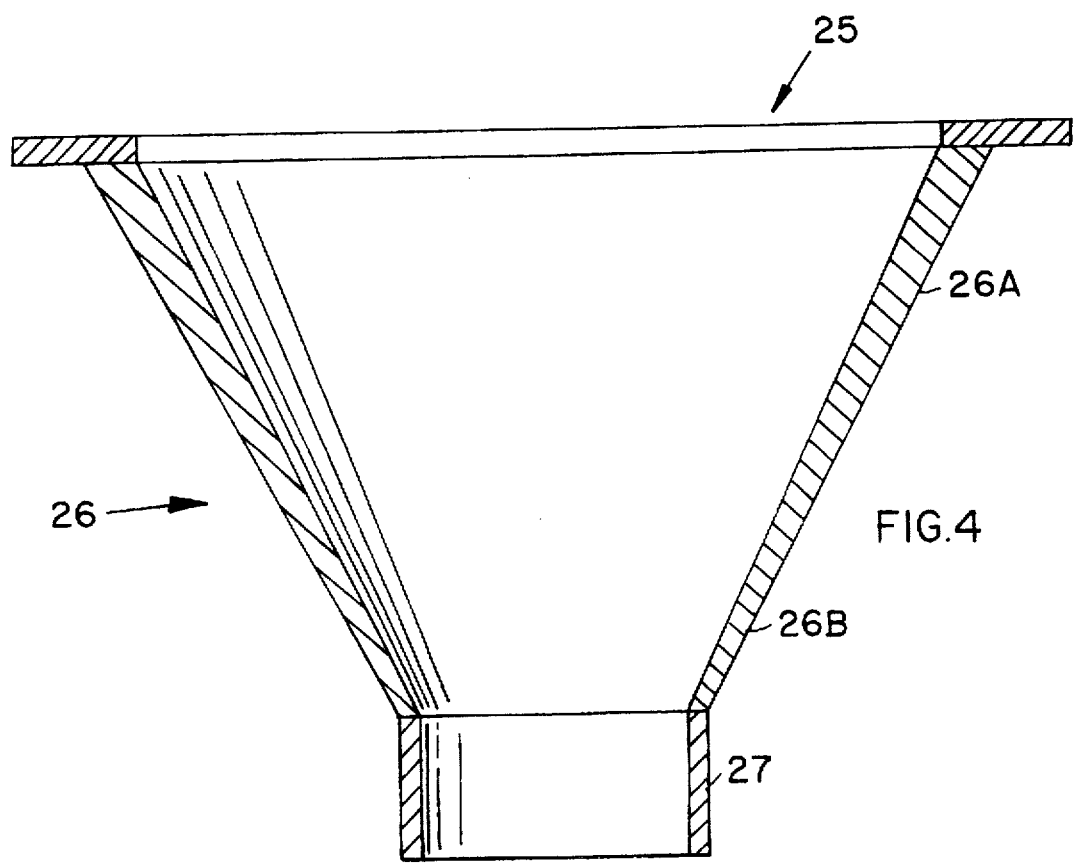

APPARATUS FOR THE METERED DISCHARGE OF BULK MATERIAL FROM A FLEXIBLE SUPPLY CONTAINER ESPECIALLY IN A DOSING SYSTEM

FIELD OF THE INVENTION

The invention relates to an apparatus for the metered discharging of bulk material from a flexible supply container such as a hopper feeding into a discharge device, the motion of which facilitates the movement of the bulk material. Such an apparatus is especially useful in combination with a dosing system for bulk materials.

BACKGROUND INFORMATION

When feeding bulk material from a supply container such as a hopper or bin it is frequently necessary to pass the bulk material with an even flow to a discharging device such as a vibrating chute. Particularly, when the bulk material such as powder or flour has a low flowability it is necessary to provide the supply container with devices that aid the discharging. Such devices conventionally involved stirring mechanisms, vibrating devices, and the like. Stirring devices have the disadvantage that the stirring elements are situated in the product space of the supply container, whereby the bulk material frequently sticks to the stirring elements from which the material must be removed at certain time intervals. These cleaning operations are time consuming and interrupt the entire dosing operations. Hence, it is desirable to avoid such stirring mechanisms.

It is also known to equip such dosing containers with a feed screw at the bottom of a funnel-shaped container and with a flexible wall portion that is exposed to the operation of a paddle positioned on the outside of the flexible wall portion. Reference is made to a brochure number F9156 "Volumetrische Dosierer" (Volumetric Dosing Device), by Carl Schenck AG, Darmstadt, Federal Republic of Germany, published October 1994. The discharging and dosing devices of this brochure have a supply hopper equipped with at least one flexible wall portion that cooperates with an externally positioned paddle or several paddles that flex the wall portion to thereby avoid jamming of the bulk material above the feed screw. The paddles are connected to a drive motor for pressing the paddles periodically against the flexible side wall portion of the supply container, thereby setting the walls of the hopper in motion so that the bulk material slides more smoothly toward the discharge opening. Such a structure while effective leaves room for improvement, especially with regard to the extra effort and expense for the external wall flexing mechanism.

Another brochure entitled "Krause Silo", by Walter Krause GmbH, Walheim, Federal Republic of Germany, published 1982, describes supply containers made of fabric which is very flexible and responds to a worm conveyor movement that is flange mounted directly to the lower end of the silo or container. A milk powder container feeds directly into a vibrating chute.

Such vibrating chutes are also disclosed in U.S. Pat. No. 4,972,970 (Toerner), issued on Nov. 27, 1990 and relating to a "Method and Apparatus for Moving Bulk Material Through a Chute". A hopper (5) is connected with its lower discharge opening to the chute (3) by an elastic connecting sleeve (6). Additionally, the discharge container is connected to a vibratory drive (10) which operates shaker elements (12, 13). These shaker elements reach into the vibratory chute which is mounted on a spring support (2). Additionally, the chute itself may be vibrated. However, the elastic sleeve (6) prevents any transfer of vibratory motions from the chute 3 to the supply container (5).

German Patent Publication 2,409,125 A1 (Bennigsen-Mackiewicz), published on Sep. 4, 1975 discloses a tank for bulk material, whereby the tank is made of flexible material such as fabric, forming a bag that is suspended in a cage type box so constructed that portions of the bag walls are connected to rods of the cage. The purpose of these rod connections is to avoid bulging of the fabric bags.

German Patent Publication DE 3,317,721 A1 (Bennigsen-Mackiewicz et al.), published on Nov. 10, 1983 discloses another flexible silo supported or mounted in a frame box, whereby the fabric of the silo proper is substantially airtight so that the silo is altogether closed, except for the discharge opening. During the discharging of the bulk material reduced pressure is applied for removing the bulk material such as flour by suction out of the flexible container.

OBJECTS OF THE INVENTION

In view of the above it is the aim of the invention to achieve the following objects singly or in combination:

to avoid the above mentioned external vibrating mechanisms for shaking a container wall while still achieving an efficient discharge of bulk material, including bulk material having a low flowability;

to avoid so-called "bridge formation" or jamming of the bulk material, especially near the discharge end of flexible hoppers, by more efficiently utilizing vibrations present in such dosing devices; and to construct the supply container walls in such a way that different wall areas have different response characteristics to the vibration imparted to these wall areas to thereby efficiently move the bulk material through and out of the supply container.

SUMMARY OF THE INVENTION

The bulk material discharge apparatus according to the invention is characterized in that a vibrating discharge device such as a vibrating chute is directly and rigidly connected to the discharge end of a bulk material supply container to thereby transmit the vibrations of the vibrating device to the flexible wall or wall portions of the supply container and wherein the flexibility of the container wall or wall portions has a determined vibration response characteristic. Preferably, the supply container is equipped with stiffening elements in such positions that critical areas of the supply container wall have the required vibration response characteristic, for example to vibrate more than other wall areas of the supply container. This feature of the invention permits concentrating container wall vibrations where bridge formations of the bulk material tend to occur unless counteracted. By localizing the vibration effect where it is most effective and damping other wall sections of the supply container a very efficient energy consumption is achieved which utilizes the vibrations of the vibrating device in a controlled manner where the vibration effect is needed most.

The invention has yet another advantage namely that no extra or special drive is required for imparting the vibration motion to the flexible wall or wall portions of the supply container. Instead, the drive motion of the vibrating discharging device is used simultaneously for flexing those wall portions of the supply container which are exposed to bulk material build up or bridge formation to avoid such build up and bridge formations. Since the discharge devices such as the chute are continuously in a vibratory motion during operation, a respective motion is also imparted to the flexible supply container walls. By using the vibratory motions of the discharge device twice, namely for transporting bulk material from the supply container and for flexing the critical wall sections of the supply container, the invention achieves weight and energy savings.

Another advantage of the invention is seen in that it is usable in connection with substantially any type of hopper or supply container such as containers having a circular, a rectangular, or an elliptical cross-section, and flexible walls or at least flexible wall portions with a determined vibration response characteristic that can be set in motion in a controlled manner by the vibrations of the vibrating discharge device. The vibration of the discharge device is transmitted directly through a rigid connection between the chute and the supply container, the wall of which is preferably equipped with stiffening vibration damping elements in those areas which do not require to be vibrated for an efficient bulk material discharge.

BRIEF DESCRIPTION OF THE DRAWINGS

In order that the invention may be clearly understood, it will now be described, by way of example, with reference to the accompanying drawings, wherein:

FIG. 1 shows a sectional, schematic view of a vibrating chute directly and rigidly connected to the critical area of a supply hopper having flexible wall portions;

FIG. 2 is a schematic sectional view through a supply container having a circular cross-section and equipped with wall stiffening members selectively positioned for influencing the vibration response characteristic of the container wall or portions thereof;

FIG. 3 is a view similar to that of FIG. 2, showing a supply container with a rectangular cross-section and a plurality of wall stiffening members; and FIG. 4 shows an axial sectional view through a supply hopper having a funnel shape formed by hopper walls that have differing wall thicknesses along the wall length, whereby these differing thicknesses also determine the vibration response characteristics of the hopper walls.

DETAILED DESCRIPTION OF PREFERRED EXAMPLE EMBODIMENTS AND OF THE BEST MODE OF THE INVENTION

FIG. 1 shows a dosing apparatus 5 according to the invention comprising two main components, namely a supply container 3 such as a hopper or the like, and a vibratory discharge device 6 including a vibration chute 6A and a vibration drive 6B connected to the chute. The bulk material passes through the chute 6A and exits at the chute exit 6C. The vibratory chute 6A has an inlet 11 with a rigid collar 11A connected according to the invention by a rigid connector 10 directly to the discharge end of the supply container 3.

The supply container 3 has a front wall 4, a rear wall 9, and a rim 1 rigidly mounted on a machine frame 2. The rim 1 surrounds a filler opening 1A. The vibratory chute 6A is mounted on a spring frame 7 that permits the vibratory motions of the chute 6A driven by its vibratory drive 6B. The spring frame 7 may mount the chute 6A directly to a foundation 8 or the spring frame may be suspended in a rigid support frame. In both instances the construction is such that the chute and with it the respective wall portions of the supply container 3 may freely vibrate in a controlled manner.

In order to permit the just mentioned vibration the front wall 4 and the rear wall 9 of the supply container 3 are made of a flexible material. Alternatively, only a portion 4A and a portion 9A of the front and rear walls are made of flexible material and these portions 4A and 9A are rigidly connected through the rigid connector 10 to the collar 11A of the chute inlet 11. These walls 4 and 9, or at least the wall portions 4A and 9A, are made of rubber, rubberized textile fabrics, flexible synthetic materials, or other materials having the required flexibility and material strength for the controlled vibrations imparted to these portions of the supply container 3 by the drive 6B through the chute 6A. Stiffening members 14, 16 to be described in more detail below, may be used in FIG. 1 for determining the vibration response characteristic of the container walls.

The supply container 3 may have any cross-sectional configuration such as circular, square, rectangular, elliptical, or any other suitable form for the intended purpose of feeding the bulk material to the inlet 11 of the vibratory chute 6A. The flexible wall portions 4A and 9A must be located where the bulk material, such as powdery material, has a tendency to form bridges to bunch-up near the discharge opening of the supply container. In this connection it is, for example, possible to construct the upper portion of the supply container 3 as a cylinder of rigid material while making the lower portion of the container as a funnel of flexible material, whereby the funnel neck is rigidly connected to the inlet collar 11A of the chute 6A.

In all embodiments whether the supply container has a uniform wall thickness or different wall thicknesses, the wall thicknesses will be so selected that the required elasticity is obtained where it is needed to thereby determine or influence the vibration response characteristic of the walls. The determination of the wall thickness will take into the account the required material strength.

The construction shown in FIG. 1 in which the funnel neck that forms the rigid connection 10 to the collar 11A of the vibratory chute 6A, takes advantage of the chute. vibrations caused continuously during operation by the drive 6B as long as material is being discharged through the exit 6C. The chute imposes a directed force component onto the bulk material in the chute for moving the bulk material in the feeding direction FD. The vibratory drive 6B is, for example, an electromagnetic vibration generator or a mechanical unbalance generator which produces a so-called micro-slow motion in the feed advance direction FD to move the bulk material toward the discharge 6C.

Due to the above mentioned rigid connection 10 between the flexible lower end of the container 3 and the collar 11A of the chute inlet, the vibration of the chute 6A is directly transmitted to the flexible wall portions 4A, 9A of the container 3, thereby continuously flexing these wall portions 4A and 9A with the vibration of the chute 6A. It is possible to properly construct the flexible walls or wall portions 4A, 9A so that the resonance frequency or vibration response characteristic of these wall portions will efficiently respond to the vibration frequency of the chute or resonate therewith, thereby providing an effective and efficient discharge aid to the bulk material in the container 3. Depending on the consistency and stickability of the bulk material, it is possible by the tuning according to the invention of the resonance frequency of the vibration portion of the container wall or walls to the frequency of the chute vibrations to provide a uniform bulk material discharge free of trouble, thereby also assuring a high precision in the dosing quantities. By varying the wall thickness and flexibility of the wall portions 4A, 9A so that the areas most subject to sticking and bridge building, will have a maximum flexing amplitude, such sticking and bridge building is effectively prevented, thereby assuring a uniform discharge.

In the embodiment of FIG. 1, the bulk material moves by gravity from the container 3 into the chute 6A. However, the discharge may be further facilitated by feed screws, dosing conveyors, and other dosing systems provided that any of these devices and systems have a sufficient oscillating or resonance movement due to being positively driven. If such a discharge enhancing device is spring supported or spring suspended, the transmission of the resonance vibrations of the positive drive device to the flexible container walls is enhanced. This enhancing effect can be amplified by using an unbalanced drive for the particular discharge device in order to impose a controlled discharging force having the required amplitude and direction for the intended purpose of moving the bulk material without jamming to the discharge end 6C.

Referring further to FIG. 1, it is preferably, but not absolutely necessary that the walls 4 and 9 including the flexible wall sections 4A and 9A are equipped with damping members 14 and 16. The number, length, and cross-sectional size of these damping members 14, 16 will depend on the intended vibration control. By routine experiment it is possible to shape, dimension and place the vibration damper members 14 and 16 in such a way that the feed advancing force component will effectively counteract the above mentioned bridge formation and jamming of the bulk material.

FIG. 2 shows a supply container 12 in which the lower container portion 13 is flexible, but the flexibility is controlled by damping members 14, 16 functioning as stiffening members 14 and 16 which preferably have an elliptical cross-section so positioned that the long axis of the ellipsis extends in a central vertical plane CP of the supply container 12. The central plane CP in turn extends in parallel to the feed advance direction FD. This arrangement of the stiffening or damping members 14 and 16 permits controlling the vibratory shape indicated by dashed lines V to effectively prevent an accumulation of bulk material near the exit 10 of the container. If such a container is rigidly secured with its lower discharge exit 10 to a vibratory dosing chute, a strong vibratory motion of the lower container end is achieved and that motion deforms the lower container end in the just mentioned elliptical shape indicated by the dashed line 3. It has been found that this vibratory deformation V of the lower container end 13 feeds the bulk material especially effectively toward the discharge and through the discharge, whereby the energy expended in vibrating the chute simultaneously is utilized to deform the lower container end 13 as just described.

FIG. 3 illustrates an embodiment in which the container 17 has a rectangular shape with a flexible lower container section 22 also of rectangular shape. Two stiffening members 18 and 21 are secured to the flexible lower container section 22 substantially in the corners thereof. Two further stiffening members 23 and 24 are connected to the rear portion of the lower container section and of the upper container section as seen in FIG. 3. These stiffening members 23 and 24 are also substantially positioned in or near the respective corners. Preferably, all stiffening members 18, 21, 23 and 24 have an elliptical cross-section, whereby the long ellipsis axis extends in parallel to the central plane CP. The length, position, cross-sectional dimension, and strength of the stiffening members 18, 21, 23 and 24 will be selected to control the vibration pattern V of the lower flexible walls 15, 19, 20 of the flexible lower container section 22 as desired. When the lower container portion is rigidly connected to a vibratory chute in a force transmitting manner, the flexible wall portions will flex as indicated by the dashed lines V. The predominant force component applied to the bulk material will again be directed in the feed direction FD as in the other figures.

In all embodiments an efficient energy saving deformation of the flexible supply container or of the flexible portion of the supply container is achieved as indicated by the vibration patterns V shown in dashed lines in FIGS. 2 and 3. The vibration pattern may be influenced by the proper selection of the damping elements 14, 16, 18, 21, 23, and 24 as described above.

FIG. 4 illustrates a sectional view through a supply container 25 according to the invention. The container 25 has side walls 26 that are thicker along an upper portion 26A than along a lower portion 26B that merges into the discharge funnel neck 27 of the container 25. According to the invention the funnel neck 27 is rigidly connected to a vibratory chute or the like as shown in FIG. 1. In the construction shown in FIG. 4, the upper container wall section 26A is substantially rigid while the lower container wall section 26B is substantially flexible due to the thinner wall. Thus, by properly selecting the wall thickness possibly different in different wall portions, the flexibility of the discharge lower portion of the supply container may also be controlled or determined. Such control may be combined with stiffening members. Preferably, the first wall thickness 26A gradually tapers into the second wall thickness so that a respective flexibility increases toward the discharge opening 27.

Preferably, the first and second container wall sections 26A and 26B are made of the same material which is substantially rigid along the first wall thickness and flexible along the second wall thickness due to the thinner second wall thickness.

Suitable materials for making the supply containers according to the invention may be selected from rubber, rubberized textile fabrics, flexible synthetic materials, and any other materials such as sheet metal having the respective flexibility and material strength.

The present bulk material discharge apparatus can be used in combination with differential dosing weighing scales and any other applications where the transport of bulk material, especially powdery bulk material requires a prevention of jamming or bridge building. Especially in connection with differential dosing scales the present system is advantageous due to its small weight so that the system can be economically employed in connection with weighing cells of small rated loads.

Although the invention has been described with reference to specific example embodiments, it will be appreciated that it is intended to cover all modifications and equivalents within the scope of the appended claims.

What is claimed is:

1. An apparatus for discharging bulk material comprising a bulk container for holding bulk material, said bulk container having a container wall with a determined vibration response characteristic, a filling opening, a discharge opening, and at least one movable wall portion (4A, 9A) in said container wall for transmitting a discharge enhancing motion to bulk material inside said bulk container, a discharging device (6) for feeding bulk material out of said bulk container, a rigid vibration transmitting mounting (10) rigidly securing said discharging device (6) to said discharge opening of said supply container for transmitting vibratory motions of said discharging device (6) through said movable wall portion (4A, 9A) of said bulk container to said bulk material, and a flexible mounting (7) movably securing said discharging device (6) to a fixed support (8) for substantially preventing the transmission of said vibratory motions of said discharge device (6) to said fixed support (8) while enhancing the transmission of said vibratory motion of said discharging device (6) to said bulk material through said at least one movable wall portion (4A, 9A) and through said rigid vibration transmitting mounting (10).

2. The apparatus of claim 1, wherein said at least one movable wall portion (4A, 9A) is made of flexible material that determines said vibration response characteristic.

3. The apparatus of claim 1, wherein said container wall is entirely made of flexible material having said determined vibration response characteristic.

4. The apparatus of claim 1, further comprising stiffening members (14, 16) secured to said at least one movable wall portion (13) for dampening deformations of said at least one movable wall portion (13) to thereby influence said vibration response characteristic.

5. The apparatus of claim 4, wherein said container (12) has a substantially circular cross section and wherein said stiffening members (14, 16) comprise two stiffening rods secured to said at least one movable wall portion in positions diametrically opposite each other in a plane passing centrally and longitudinally through both stiffening members (14, 16), said plane extending in a discharge direction (FD).

6. The apparatus of claim 5, wherein said stiffening rods have an elliptical cross-section each with a longer axis and a shorter axis, and wherein both longer axes extend in said plane and thus in said discharge direction (FD).

7. The apparatus of claim 4, wherein said container has a substantially square or rectangular cross section with four corners, and wherein said stiffening members comprise four stiffening members (18, 21, 23, 24) secured to said at least one movable wall portion so that one stiffening member is arranged in each corner whereby a first plane passes centrally and longitudinally through two stiffening members in first and second corners and whereby a second plane passes centrally and longitudinally through two further stiffening members in third and fourth corners, said first and second planes extending in parallel to each other and in parallel to a discharge direction (FD) of said bulk material.

8. The apparatus of claim 7, wherein said stiffening members have an elliptical cross-section with a longer axis and a shorter axis and wherein two of said longer axes extend in said first plane and two further longer axes extend in said second plane, so that all longer axes extend in parallel to said discharge direction (FD).

9. The apparatus of claim 1, wherein said flexible mounting comprises at least one spring (7) which flexibly secures said discharging device to said fixed frame below said bulk container.

10. The apparatus of claim 1, wherein said flexible mounting comprises at least one suspension member which flexibly suspends said discharging device below said bulk container.

11. The apparatus of claim 1, wherein said motion of said discharging device (6) is directed in one of two directions parallel to a discharge direction (FD) and crosswise to said discharge direction.

12. The apparatus of claim 1, wherein said discharging device is selected from the group consisting of vibration conveyors, screw conveyors, belt conveyors, and bulk conveyors having inherent motions in operation, said rigid mounting transmitting at least a portion of said inherent motions to said movable wall portion of said bulk conveyor.

13. The apparatus of claim 1, further comprising a vibration drive (6B) rigidly connected to said discharging device (6) for imparting a vibratory motion through said discharging device (6) to said at least one movable wall portion of said container wall through said rigid mounting.

14. The apparatus of claim 1, wherein said at least one movable wall portion forms a lower section of said bulk container, and wherein said rigid mounting comprises a rigid collar (10) securing said discharging device (6) to said lower flexible bulk container section.

15. The apparatus of claim 1, wherein said container wall has a first container section with a first wall thickness near its filling opening (1A) and a second container section with a second smaller wall thickness near its discharge opening, so that said first container section is substantially rigid while said second container section is substantially flexible due to said thinner wall section, said wall thicknesses differing from each other sufficiently for determining said vibration response characteristic of said container wall or wall portion.

16. The apparatus of claim 15, wherein said first wall thickness gradually tapers into said second wall thickness so that a respective flexibility of said second container section increases toward said discharge opening.

17. The apparatus of claim 15, wherein said first and second container sections are made of the same material which is substantially rigid along said first wall thickness and flexible along said second wall thickness.

* * * * *